Aug. 30, 1932.  L. SAIVES  1,874,810
ELECTRICALLY CONTROLLED MILLING MACHINE FOR METAL
Filed Nov. 20, 1930   3 Sheets-Sheet 1

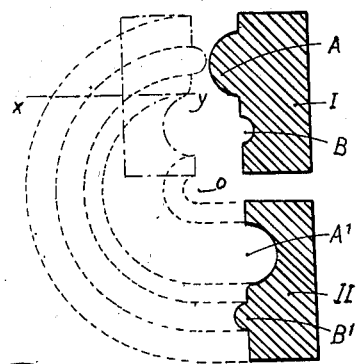
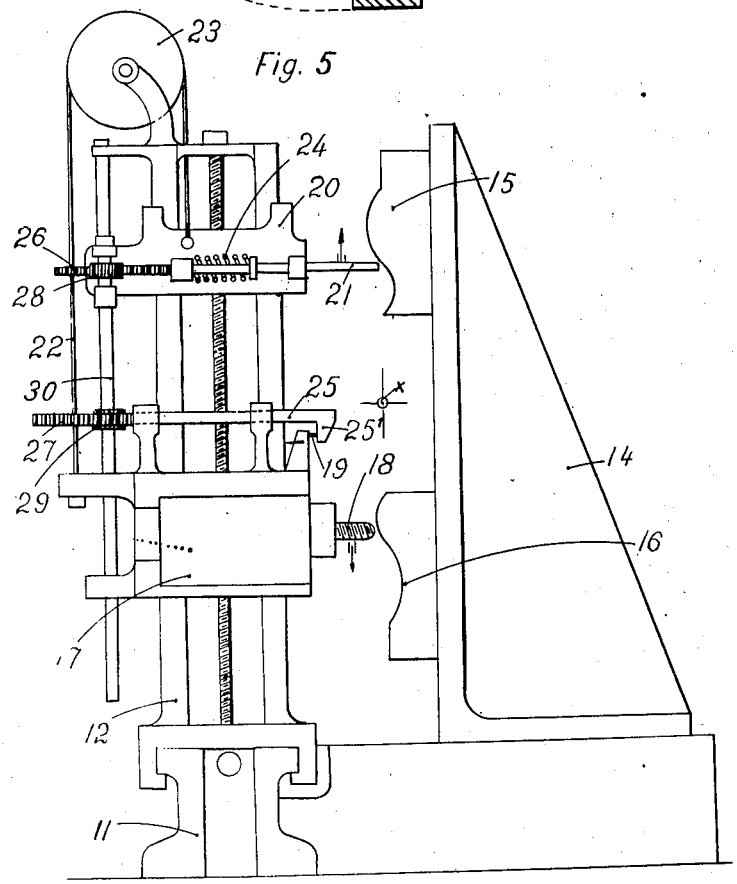

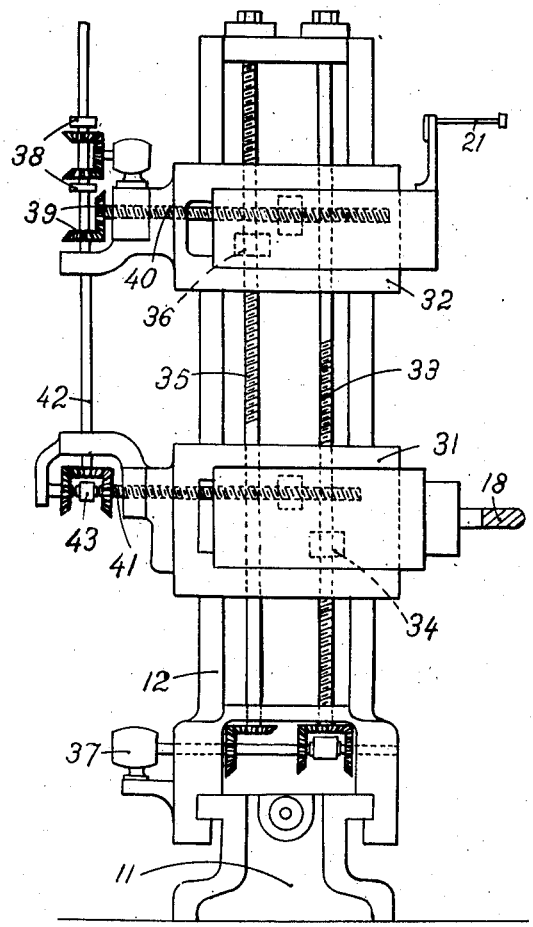

Patented Aug. 30, 1932

1,874,810

UNITED STATES PATENT OFFICE

LEON SAIVES, OF BILLANCOURT, FRANCE, ASSIGNOR TO LOUIS RENAULT, OF BILLANCOURT, FRANCE

ELECTRICALLY CONTROLLED MILLING MACHINE FOR METAL

Application filed November 20, 1930, Serial No. 497,020, and in France March 5, 1930.

The present invention relates to milling machines, and chiefly to electrically-controlled milling machines for metals.

The electrically-controlled milling machines for metals, of the John Shaw type, specified in French Patent No. 587,919, provide for the milling of pieces of any form, by an exact reproduction of a pattern having the form of the piece to be milled.

This result is obtained by means of a contact point which is movable upon the surface of the pattern and which serves, through the medium of electric relays and electromagnetic clutches, to move the milling cutter according to a like path, and thus when the said contact point has covered the entire surface of the pattern, the surface of the milled piece will be exactly the same as that of the pattern.

Such machines are employed chiefly for the manufacture of matrices for stamping and embossing. For this purpose, a complete outfit usually comprises four principal parts: a die, a matrix which fits upon the said die, allowing for the thickness of the sheet metal, a fixed pressing device and a movable pressing device whose forms must exactly coincide. For the manufacture of these four pieces, four different patterns are required. On the other hand, when the pieces leave the machine, they must be well adjusted together, as it is rare that the patterns are such that the pieces made by their use will perfectly fit together.

The invention as hereinafter described relates to improvements in the John Shaw machine by which the same pattern can be employed to produce the two corresponding pieces, that is, a piece resembling the pattern, which is the male piece, and the corresponding piece, which is the female piece. This latter is the reverse of the pattern, and its sunken parts correspond to the raised parts of the pattern, and inversely.

Fig. 4 is a diagrammatic view relative to the invention.

Figs. 5, 6 and 7 show improved devices for producing a female piece by the use of a male piece.

Fig. 5 is a front view of the machine.

Fig. 6 is a plan view of the reversing arrangement.

Fig. 7 is a modification of Fig. 6.

Figure 1:
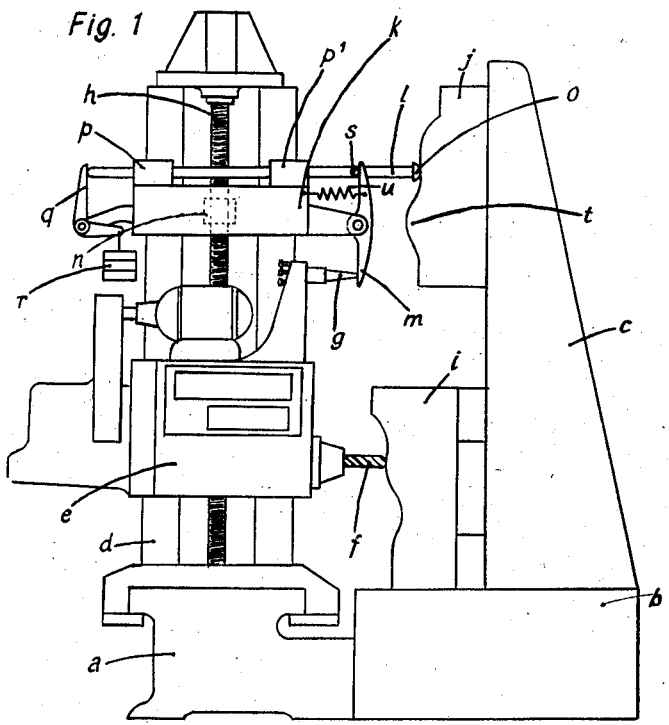
Fig. 1 is a front view of a John Shaw machine, provided with the improvements, the subject-matter of the invention.

In Fig. 1, the parts shown in the heavy lines are the ones relating to the invention; the parts in fine lines represent the normal machine.

$a$ is the stationary frame of the machine, $b$ the table supporting the piece of work and the template or pattern, $c$ is a rightangled bracket serving to hold the said piece and template, $d$ is the stock which is horizontally movable on the said frame, $e$ is the carriage supporting the milling cutter, which is vertically movable on the stock, $d$, $f$ the milling cutter, $g$ the contact point which in the ordinary machine is moved over the pattern, $h$ the screw driving the said carriage, $i$ the piece of work to be milled, $j$ the pattern, $k$ an additional slide provided with a nut $n$, in such manner that the vertical motion of said slide will be the same as that of the said carriage $e$.

The slide $k$ carries two supports $p$ $p'$ in which is slidable a rod $l$ having at its end a contact point $o$ which is in constant contact with the surface of the pattern or template $j$, due to a bell-crank $q$ and weight $r$. The said slide also carries a double lever $m$ which is pivotably mounted at its center and whose upper end is in contact with a stud $s$ mounted on the rod $d$, its lower end being in contact with the end of a contact plunger $g$. The position of the pivoting point of the lever $m$ is such that it will be exactly in the middle of the line joining the points of contact of the stud $s$ and the contact plunger $g$.

The operation is as follows:

The machine is supposed to be in operation, and the carriage $e$ and slide $k$ on the descent; when the contact point $o$ meets the raised part $t$ of the pattern, the stud $s$ recedes, the lever $m$ (which is brought back by a small spring $u$) will be inclined to the left, the lower part of said lever inclines by the same amount to the right, and the plunger $g$, which follows the movement, will move forward the milling cutter f, thus forming in the piece of work i a hollow part corresponding to the raised part of the pattern.

The complementary device added to the machine serves only to reverse the motion, and any reversing gear consisting of levers, gearing, cables, etc. may be employed with the said apparatus.

Figure 2:
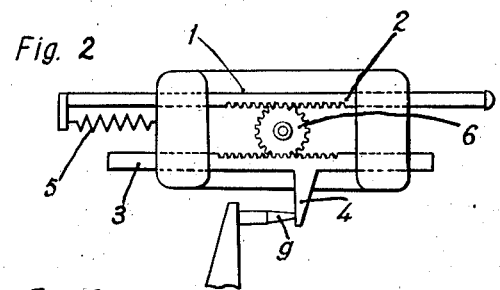
Figs. 2 and 3 show two details of the apparatus according to the invention.
Figure 3:
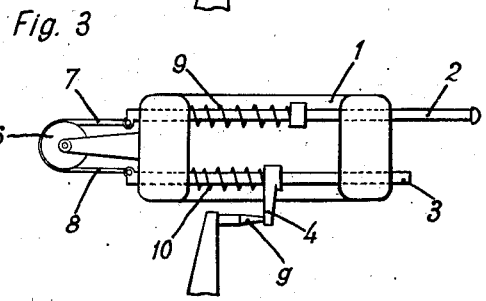

Figs. 2 and 3 show by way of example two modifications which may be employed.

In Fig. 2, 1 is the special carriage, 2 is the rod carrying the contact point, 3 is a second rod carrying a tappet 4 which is in contact with the electromagnetic contact plunger of the machine, 5 is a small reaction spring assuring contact between the contact point of 2 and the pattern, 6 is a gear wheel cooperating with racks formed on the rods 2 and 3. It will be observed in the figure that when the end of the rod 2 which carries the said contact point moves to the right, the tappet 4 will move to the left by the same amount, and inversely.

In Fig. 3, 1 is the special slide, 2 the rod carrying the contact point, 3 a second rod carrying the tappet 4, in contact with the electromagnetic plunger g of the machine, 6 is a pulley carrying a cable 7—8 whose ends are attached to the respective rods 2—5; 9 and 10 are reaction springs controlling the rods; the effect of the spring 9 exceeds that of the spring 10. It is observed that the motion of the rod 5 is the reverse of the motion of the rod 2.

Obviously, the invention is not limited to these three descriptions of the movements, and the invention covers the use of any reversing movement upon a Shaw machine; for this purpose, it is simply necessary that the contact point shall move upon the pattern and act upon the electromagnetic plunger of the machine, in such manner that all motion in the direction of the contact point will produce the same movement, but in the contrary direction to the milling cutter.

It may happen in certain cases that the pattern j consists of the piece of work itself. If the thickness of the sheet metal to be embossed is X millimeters, it will suffice that the radius of the end of the contact point o (Fig. 1) shall be equal to the radius of the end of the milling cutter, increased by X millimeters.

The constructions shown by way of example are however limited to operations upon pieces having an axis of symmetry. In fact, as shown in Fig. 4, a male piece I having a projection A and a sunken part B, when used with the said device, will afford a female piece II having a sunken part A' and a projection B'. If the said female piece II is pivoted about the point O in order to bring it adjacent the male piece I, the projection B' comes opposite the projection A and the sunken part A' opposite the sunken part B, and thus the two pieces cannot fit into one another, for it would be necessary that the sunken part A' should coincide with the projection A.

To obtain this condition, the female piece must be turned through 180° about an axis x—y, so that the right hand side of the female piece will coincide with the left hand side of the male piece, this being possible if the piece has a plane of symmetry. In order to produce a female piece from a male piece which does not have an axis of symmetry, the aforesaid arrangements must be modified, while the principle remains the same, that is, the milling cutter should move in the contrary direction to the said contact point.

Figs. 5, 6 and 7 are diagrammatic views showing these modified constructions.

In Fig. 5, 11 is the base of the machine, 12 the sliding device carrying the milling cutter and the contact point, 14 the right-angled bracket supporting the pattern 15 and the piece of work 16. The said sliding device 12 is provided with a carriage 17 upon which the milling cutter and the said plunger are mounted, which is analogous to the carriage employed in the usual machines, the milling cutter being mounted at 18 and the plunger at 19; (b) with a second carriage 20 which is slidable on the device 12 and carries a contact point 21.

The carriage 20 is connected with the carriage 17 by a cable 22 which is mounted on a loose pulley 23 and of which one end is attached to 20 and the other to 17, so that the carriage 20 will descend when the carriage 17 rises, and inversely. The contact point 21, mounted on the carriage 20, is constantly urged against the pattern 15 by the spring 24, and the motion of said contact point is imparted to a rod 25 mounted on the carriage 17, by a suitable reversing mechanism, known per se, and shown in Fig. 6 as having the form of two racks 26—27 and two pinions 28—29 mounted on a common shaft 30 and slidable on a key of the said shaft. At the end of the rod 25 is a hook 25' in contact with the plunger 19 of the carriage 17.

The operation is as follows. When the milling cutter carriage 17 descends, the carriage 20 rises, and the contact point 21 moves over the surface of the pattern, and due to the reversing movement, the end of the milling cutter will describe an outline which is the reverse of that of the pattern; it is further observed that the piece produced by the milling cutter is exactly the reverse of the pattern, because if the piece 16 is represented as pivoting about an axis x, the said piece will fit exactly upon the pattern.

Fig. 7 shows a second modification of the apparatus, in which 11 is the base or frame of the machine, and 12 the sliding device. On the latter are mounted a carriage 31 for the milling cutter and a carriage 32 for the contact plunger. The vertical movements of the two carriages are controlled by two distinct screws, that is, the screw 33 controlling the carriage 31 by means of the nut 34, and the screw 35 controlling the carriage 32 by means of the nut 36. These two screws are driven at their lower part by a common motor 37 by means of bevel gearing; the screw 33 is provided with a reversing device. Thus the two carriages may be driven in the same or in opposite directions.

The carriage used for the contact point is constructed after the manner of the usual carriages of die-milling machines, except that it has no means for moving the milling cutter; the contact point of said carriage controls the motion of the screw 40 by the use of electro-magnetic clutches 38 and bevel gearing 39. The motion of the screw 40 is imparted to the screw 41 of the milling cutter carriage by the vertical sliding shaft 42 and the change-speed mechanism 43. With this arrangement, the milling cutter may move in the same direction as the contact point, or in the contrary direction.

The operation, for producing a female piece from a male piece, is as follows.

The vertical screw 33 is thrown in by the clutch in such manner that the carriage 31 will move in the contrary direction to the carriage 32, and the screw 41 is thrown in by the clutch in such manner that the milling cutter will move in the contrary direction to the contact point. This affords the same conditions as in the machine represented in Fig. 5, and the form of the piece produced is exactly the reverse of that of the pattern.

The advantage offered by this arrangement is that the machine is now of the universal type, and the same pattern can be employed to produce the following: (1) a piece resembling the pattern; (2) a piece of the inverse form; (3) a symmetrical piece; (4) the inverse of this latter.

In fact, when the movements of the vertical screws 33 and 35 are the same, as well as the movements of the horizontal screws, the piece resembles the pattern. If only the motion of the vertical screw 33 is reversed, the resulting piece is symmetrical with reference to the pattern. If only the motion of the horizontal screw 41 is reversed, the resulting piece is the inverse of the piece symmetrical with the pattern, that is, symmetrical with the last-mentioned piece. If the movements of the screws 33 and 41 are both reversed, the piece produced is the inverse of the pattern, as herein above stated.

I claim:

1. An attachment for milling machines having a vertically movable cutter carriage, comprising a laterally movable arm having at its end a point adapted at all times to contact and ride vertically over the face of a pattern during the vertical movements of said slide, means for maintaining contact between said point and the face of the pattern, and means whereby lateral movement of said arm will cause a lateral movement of the cutter carriage in an opposite direction.

2. An attachment for milling cutters, comprising a vertically-movable slide equipped with a laterally-movable rod terminating in a contact point adapted to ride over the face of a pattern, a stud projecting from said rod, a laterally-movable milling cutter, and a double-armed lever pivotally mounted on said side, one end of said lever being adapted to engage said stud and the other end thereof being adapted for actuation to cause a movement of the milling cutter with respect to said stock.

3. An attachment for milling cutters, comprising a vertically-movable slide equipped with a laterally-movable rod terminating in a contact point adapted to ride over the face of a pattern, a stud projecting from said rod, a laterally-movable milling cutter, a double-armed lever pivotally mounted on said slide, one end of said lever being adapted to engage said stud and the other end thereof being adapted for actuation to cause a movement of the milling cutter with respect to said stock, and means constantly urging said contact point against the surface of the pattern.

4. The assembly as specified in claim 1, in which there is provided a reversing device for the contact plunger and the milling cutter, consisting of oppositely movable, parallel rack bars, each engaging a pinion mounted on a shaft, one of said bars carrying the contact point and the other bar being equipped with a tappet adapted to shift the milling cutter.

5. A milling machine of the John Shaw type, including a laterally movably-mounted contact point adapted to engage a pattern, means for moving said contact vertically over the pattern, a milling cutter adapted for lateral movement towards and away from the stock in which the pattern is to be duplicated, means whereby a movement of the contact point in one lateral direction may simultaneously cause a similar movement of the milling cutter in a reverse lateral direction, and means for moving the milling cutter vertically corresponding to the vertical movement of the contact but in a direction reverse thereto.

In testimony whereof he has signed this specification.

LEON SAIVES.